Patented Aug. 5, 1941

2,251,399

UNITED STATES PATENT OFFICE 2,251,399

STORAGE BATTERY EXPANDER

Robert M. Cole, Bryn Athyn, Pa.

No Drawing. Application August 2, 1939,
Serial No. 287,955

6 Claims. (Cl. 136—26)

This invention relates to expanders for storage batteries of the lead-acid type.

The addition of various substances (commonly termed "expanders"), to the active material of storage battery plates, especially to the negative plates, has been known for some time, the purpose being to improve operation, particularly with respect to maintenance of capacity during discharge at low temperatures.

The present invention contemplates expanders of greatly increased effectiveness, as compared with those employed in the prior art.

I have found that oxidizing-reducing couplets are effective as battery expanders, the material being alternately reduced and oxidized with charge and discharge of the battery.

The expander of the present invention is chosen from organic substances (natural or synthetic) which exist in a reversible equilibrium in the oxidized and reduced states. I have found the color groups which exist in natural dyestuffs to be effective. For example, the following are effective: hematine-hematoxylin (logwood extracts), brazilin-brazilone (Brazil wood), quercitin-quercitone (quercitron extract), and maclurin-morin (old fustic or osage).

Of the above group I have found the couplet hematine-hematoxylin to be particularly suitable and I therefore prefer to use it, especially since it is readily available commercially.

The expander selected is incorporated in the active material of the battery, as by mixing the expander in the form of a paste or powder with the litharge or lead oxide paste, which is thereafter pressed or trowelled into the grids. As an example, when incorporating hematine-hematoxylin, the material may conveniently be added during preparation of the paste in the form of finely divided or powdered hematine. This material, being freely convertible to hematoxylin, is alternately converted between the two forms, as the battery is charged and discharged.

Any of the expanders herein proposed may be initially incorporated either in the reduced or in the oxidized state, although initial incorporation in the oxidized state is preferable because in that form the material is insoluble.

While I do not wish to limit myself to matters of theory, the improved expanders of the present invention apparently approach the true function intended to be performed by such expanders, by virtue of the fact that the material added probably forms a loose chemical union with the lead. It may be that the effectiveness of the material is due to its presence in one form or the other or in an intermediate conversion state.

Whatever the reasons, I have found the particular oxidizing-reducing couplets herein contemplated to be very much more effective than any expanders heretofore employed. The batteries in which such expanders are incorporated maintain unusually high capacity or amperage even throughout extended periods of heavy discharge at low temperatures. The effectiveness of the improved expanders is also maintained substantially unimpaired throughout the life of the batteries.

As to the quantity employed, a fraction of 1%, for instance .125% of the paste by weight, is sufficient, although almost any value from a trace up to several per cent. may be used.

I claim:

1. For a storage battery, a plate of the lead oxide type containing an oxidizing-reducing couplet chosen from the class consisting of hematine-hematoxylin, brazilin-brazilone, quercitin-quercitone and maclurin-morin.

2. For a storage battery, a plate of the lead oxide type containing the hematine-hematoxylin couplet.

3. For lead storage battery paste, a composition containing lead oxide and an oxidizing-reducing couplet chosen from the class consisting of hematine-hematoxylin, brazilin-brazilone, quercitin-quercitone and maclurin-morin.

4. For lead storage battery paste, a composition containing lead oxide and the hematine-hematoxylin couplet.

5. For a storage battery, a plate of the lead oxide type containing an oxidizing-reducing couplet chosen from the class consisting of hematine-hematoxylin, brazilin-brazilone, quercitin-quercitone and maclurin-morin, said couplet being present in an amount from a trace up to several per cent.

6. For a storage battery, a plate of the lead oxide type containing the hematine-hematoxylin couplet, in an amount from a trace up to several per cent.

ROBERT M. COLE.